(12) United States Patent
Prytkov et al.

(10) Patent No.: US 10,657,354 B2
(45) Date of Patent: May 19, 2020

(54) COMPACT SYSTEM FOR REGISTERING PAPILLARY RIDGE PATTERNS

(71) Applicant: ABILMA LLC, St. Petersburg (RU)

(72) Inventors: Anton S Prytkov, St. Petersburg (RU); Anatoly A. Leyrikh, Moscow (RU)

(73) Assignee: ABILMA LLC, Moscow (RU)

( * ) Notice: Subject to any disclaimer, the term of this patent is extended or adjusted under 35 U.S.C. 154(b) by 13 days.

(21) Appl. No.: 15/656,534

(22) Filed: Jul. 21, 2017

(65) Prior Publication Data

US 2017/0323143 A1 Nov. 9, 2017

Related U.S. Application Data

(63) Continuation of application No. PCT/RU2016/000032, filed on Jan. 29, 2016.

(30) Foreign Application Priority Data

Jan. 23, 2015 (RU) ................................ 2015102014

(51) Int. Cl.
*G06K 9/00* (2006.01)
*G02B 17/00* (2006.01)

(52) U.S. Cl.
CPC ....... *G06K 9/00046* (2013.01); *G02B 17/006* (2013.01); *G06K 9/0008* (2013.01)

(58) Field of Classification Search
CPC . G06K 9/00046; G06K 9/0008; G02B 17/006
USPC ....................................................... 382/125
See application file for complete search history.

(56) References Cited

U.S. PATENT DOCUMENTS

| 5,859,420 | A | 1/1999 | Borza | |
|---|---|---|---|---|
| 6,324,020 | B1 * | 11/2001 | Teng | G06K 9/00046 356/71 |
| 6,381,347 | B1 * | 4/2002 | Teng | G06K 9/00046 356/71 |
| 7,034,284 | B2 * | 4/2006 | Torii | G01V 8/14 250/221 |
| 7,567,342 | B2 | 7/2009 | Reinhold et al. | |
| 8,320,645 | B2 | 11/2012 | Maase | |

(Continued)

FOREIGN PATENT DOCUMENTS

| CN | 102254168 | * 11/2011 | ............... G06K 9/00 |
|---|---|---|---|
| DE | 4324296 | * 2/1994 | ........... G06K 9/0067 |

(Continued)

*Primary Examiner* — Jerome Grant, II
(74) *Attorney, Agent, or Firm* — Arent Fox LLP; Michael Fainberg

(57) ABSTRACT

The invention relates to the field of biometric identification. The technical result consists in decreasing the overall dimensions and increasing the reliability of a system for registering papillary ridge patterns, while providing for reduced cost, high image quality, rapid operating speed and reduced energy consumption. The present system comprises a light source, an element which defines the position of a reading surface, an optical system, and a multi-element image receiver, wherein the reading surface is optically linked to the image receiver by rays passing through a guiding optical element, comprising a refractive surface and a reflective surface, by means of consecutive refraction on the refractive surface, reflection on the reflective surface and total internal reflection on the refractive surface.

4 Claims, 1 Drawing Sheet

(56) References Cited

U.S. PATENT DOCUMENTS

| | | | |
|---|---|---|---|
| 2003/0053228 A1* | 3/2003 | Lee | A61B 5/103 359/860 |
| 2004/0099789 A1* | 5/2004 | Lin | H01L 27/14625 250/208.1 |
| 2005/0226480 A1 | 10/2005 | Benedix et al. | |
| 2007/0116331 A1* | 5/2007 | Rowe | G06K 9/00046 382/127 |
| 2007/0160269 A1* | 7/2007 | Kuo | G06K 9/00046 382/124 |
| 2007/0280514 A1* | 12/2007 | Heidt | G06K 9/00046 382/124 |
| 2009/0103788 A1* | 4/2009 | Maase | G02B 13/24 382/124 |
| 2010/0008552 A1* | 1/2010 | Shin | G06K 9/0012 382/124 |
| 2011/0155889 A1* | 6/2011 | Lin | H01L 27/14678 250/208.1 |
| 2015/0022648 A1* | 1/2015 | Kim | G06K 9/00046 348/77 |
| 2015/0316706 A1* | 11/2015 | Fujiuchi | H04N 1/02835 358/482 |
| 2017/0350697 A1* | 12/2017 | Chen | G01S 17/08 |
| 2018/0020153 A1* | 1/2018 | Funamizu | H04N 5/23212 |
| 2018/0075283 A1* | 3/2018 | You | H01L 27/14636 |
| 2018/0152578 A1* | 5/2018 | Takahashi | H04N 1/0071 |

FOREIGN PATENT DOCUMENTS

| | | | |
|---|---|---|---|
| EP | 0359167 | * 3/1990 | G01N 21/43 |
| JP | 10240900 | * 9/1998 | G06K 9/00013 |
| JP | 2000090247 | * 3/2000 | G06K 9/00087 |
| RU | 2484524 C1 | 6/2013 | |

\* cited by examiner

COMPACT SYSTEM FOR REGISTERING PAPILLARY RIDGE PATTERNS

CROSS-REFERENCE TO RELATED APPLICATIONS

This application is a continuation of International Application PCT/RU2016/000032 filed Jan. 29, 2016, which claims benefit of priority of Russian Application 2015102014 filed Jan. 23, 2015, both of which are incorporated by reference herein.

FIELD OF TECHNOLOGY

The invention relates to the field of biometrics, particularly to systems for the automatic recording of ridge patterns.

BACKGROUND

FIG. 1 shows a diagram of a typical system for recording ridge patterns. A source of light 1 radiates onto a component 2 which determines the position of the scanning surface 3 for the subject to be recorded, such as the ridge lines on the finger or the palm of the hand. On the scanning surface, the luminous flux from the source of light ends up carrying an image of this ridge pattern on the basis of the differences in the reflection of areas corresponding to the troughs and peaks of the ridge pattern. The optical system, as a rule including a collecting lens 4, a system of mirrors 5, an objective lens 6, protective glass 7 and microlenses 8 over the image sensor, takes this flux and creates an image of the ridge pattern on the light-sensitive surface 9 of a multi-element image sensor. The image sensor converts the image from an optical image into an electronic digital image in the form of an array of intensity values proportional to the radiant flux incident on the corresponding light-sensitive element, and transmits this image to the electronic memory 10. The processing unit 11 standardizes the scale of this electronic image, thus creating the output image of the system.

The component, which determines the position of the subject to be recorded is, as a rule, designed as an optically transparent isosceles rectangular prism. However, there are variants in the design of the system for recording ridge patterns in which prisms of complex form, cylindrical components or plane-parallel plates act as the component determining the position of the scanning surface. In rarer variants, the body element of the system is the component indicating the position of the scanning surface.

The number of mirrors in the optical system may vary and determines the shape and overall dimensions of the system.

The radiation sensor, as a rule, is constructed as a bar or matrix of metal oxide semiconductor transistors or charge-coupled devices.

A common disadvantage of these systems is their considerable size. This is due to the fact that the optical axis preferably extends from the reading surface at an angle close to 45°, and the objective lens for image formation of the required quality must be placed to a considerable distance from the reading surface. With the aim of bending the optical axis in order to reduce the overall dimensions of the system the mirrors are used.

At the same time, the widespread use of biometric identification and the increased requirements for reducing the scan time have recently led to the need for mobile scanners for fingerprints and palmprints with a large reading area whilst having a small thickness providing a comfortable portability.

However, this problem was not solved by using optical scanners, since any configuration of the mirrors did not allow an efficient deflection of the optical axis immediately after leaving the receiving element in a direction parallel to the reading surface, without detriment to the dimensions in a direction perpendicular to the reading surface. So, despite the rather successfully implemented reduction in the system size shown in U.S. Pat. No. 8,320,645 dated Nov. 27, 2012, IPC G06K9/00, it uses three mirrors and the height of the device (in the direction perpendicular to the reading surface) is significant.

There are a few variants for the design of systems for recording ridge patterns which bring about the required resolution and size of the scanning field whilst having relatively low height.

Thus, U.S. Pat. No. 5,859,420 dated Dec. 1, 1999, classified under IPC G01B11/124, discloses a system in which the dimensions of the system for recording ridge pattern are reduced by replacing the receiving prism with a relatively thin ladder-type prism with several output facets, which refer to separate channels for forming parts of the registered object image, which are then combined into an output image.

This system is the closest analogue to the proposed invention. Despite the reduction in size, this layout increases the number of components in the system, which in turn increases the cost, reduces reliability and productivity, and also increases the power consumption of the device. Moreover, with this layout it is unavoidable to have the image distortion areas that correspond to the passage of rays through the boundaries of the prism steps, what is unacceptable in most applications of identification systems.

SUMMARY

The object of the present invention is to provide a system for recording ridge patterns having small overall dimensions, high reliability and low cost while providing high-quality images, a high operating speed and reduced energy consumption.

Said object is achieved in that the system for recording ridge patterns includes a source of light, an element determining the position of the scanning surface, an optical system, a multi-element image sensor, wherein the reading surface is optically linked to the image receiver by rays passing through a guiding optical element, comprising a refractive surface and a reflective surface, by means of consecutive refraction on the refractive surface, reflection on the reflective surface and total internal reflection on the refractive surface.

To compensate for the chromatism that occurs in the guiding element, the optical system can use an optical wedge, preferably located in the optical path between the reading surface and the objective lens forming the image on the image receiver. Another option to compensate for the chromatism that occurs in the optical system is to arrange between the photosensitive surface of the image receiver and the objective lens that forms the image on this surface a transparent plate the surfaces of which are deflected from the normal line to the axis of the objective lens.

The technical result provided by the set of listed features consists in decreasing the overall dimensions and increasing the reliability of a system for registering papillary ridge patterns, while providing for reduced cost, high image quality, rapid operating speed and reduced energy consumption.

DETAILED DESCRIPTION OF THE INVENTION

Figure 1:
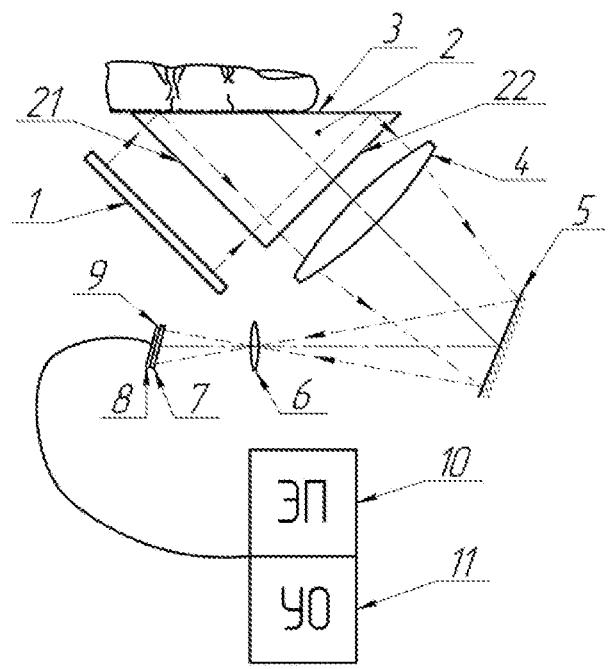
FIG. 1 is a typical schematic diagram of the design of a ridge pattern recording system.
Figure 2:
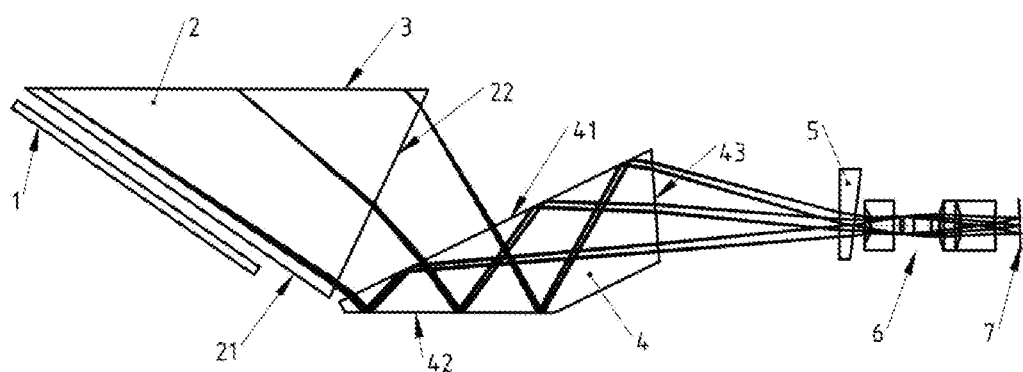
FIG. 2 is a schematic diagram of a ridge pattern recording system having small dimensions owing to the use of a guiding element between the reading surface and the objective lens forming the image on the image receiver.

An exemplary embodiment of the invention may be seen in the layout shown in FIG. 2. A source of light, taking the form of a light panel 1 constructed as light-emitting diodes, shines on prism 2 made from optically transparent material. Passing through the input leg face of the prism 21, the light is incident at an angle of total internal reflection on the hypotenuse face 3, itself determining the ridge pattern scanning surface. The subject to be recorded, such as the fingerprint or the palm of the hand, is placed on this surface. At the points corresponding to the peaks of the ridge pattern, the luminous flux from the light source is partially absorbed by the object to be recorded; in the remaining areas it is fully reflected by the hypotenuse face of the prism. In this way the luminous flux becomes a carrier of the image of the ridge pattern to be recorded. The light subsequently passes through the exit leg face 22 of the prism in the direction of the guiding element 4 made in the form of a prism. Refracting at surface 41 light is reflected on surface 42, which is having a mirror coating and again arrives to surface 41. Since the light reflected on surface 42 falls on surface 41 at an angle of total internal reflection, it reflects without loss and leaves the guiding element through surface 43. Along with this, the working light areas on surface 41 intersect during the passage and reflection what is impossible when using a mirror system. Then the light passes through the optical wedge 5 that compensates for the chromatism that occurs after passing the guiding element. The objective lens 6 forms an image of the subject to be recorded on the light-sensitive surface 7 of the monochrome camera constructed as a matrix of transistors in a metal oxide semiconductor.

In another embodiment of the system, for all subject beams coming from the reading surface to the image receiver, the condition of total internal reflection on the surface 42 is satisfied. In this case, application of a mirror coating on the surface is not required.

In yet another embodiment of the invention, the subject beams coming from the reading surface to the image receiver pass through surfaces 22, 41 and 43 at an angle that is close to normal. In this case, there is no significant chromatic aberrations at the output of the guiding element and residual chromatism can be compensated for by the objective lens forming the image on the image receiver. For this purpose, the objective lens uses a lens in the form of a meniscus of considerable thickness or an achromatic component consisting of two lenses with opposite signs of optical power and made of different materials. Another option to compensate for the chromatism that occurs in the optical system is to arrange between the photosensitive surface of the image receiver and the objective lens that forms the image on this surface a transparent plate, the surfaces of which are deviated from the normal line to the axis of the objective lens.

The applicants have manufactured several specimen ridge pattern scanners with a reading surface size of 82×82 mm and with a resolution on this surface equivalent to 500 dots per inch while the overall height of the device was less than 50 mm. A device with said parameters was the first known portable scanner of ridge pattern of four fingers, which has been able to produce an image quality complying with the FBI EBTS Appendix F standard. Experimental data confirmed that using the above-described guiding element, it is possible to produce systems for recording ridge patterns that significantly surpass the analogues in terms of overall dimensions.

Because of the fact that the guiding element represents a single structural component in which all the working surfaces are rigidly interconnected, the system improves image quality and reliability of operation in comparison to the systems in which reciprocal displacements of components can lead to deterioration of image characteristics.

Due to decreasing number of system components, reducing consumption of materials through decrease in overall dimensions, simplifying assembly and adjustment, leads to cost reduction of the devices.

Because of the fact that the system does not require to perform any software processing to combine several images from different channels into one output, the performance is increased and the power consumption of devices is reduced.

The invention claimed is:

1. A system for recording a ridge pattern comprising:
a light source, an element which defines a position of a reading surface of the ridge pattern, an optical system, and a multi-element image receiver, wherein,
the light source and the reading surface are optically linked to the multi-element image receiver by rays emitted from the light source in the direction of the reading surface being reflected from the reading surface and passing through a guiding optical element,
the guiding optical element is made in a form of a prism and comprises an input refractive surface for refraction and reflection of a luminous flux which is a carrier of an image of the ridge pattern and a reflective surface and a surface for output of the luminous flux, and
the guiding optical element is located in a device such that the rays, being a carrier of the ridge pattern and coming out of the element, are first refracted on the input refractive surface, then are reflected from the reflective surface and fall again on the input refractive surface at an angle of full internal reflection, and after having been reflected from the input refractive surface go out through the surface for outputting of the luminous flux towards the multi-element image receiver.

2. The system of claim 1, wherein the optical system further comprises an optical wedge, the optical wedge being for chromatism compensation.

3. The system of claim 2, wherein the optical wedge is located in an optical path between the reading surface and an objective lens forming an image on the image receiver.

4. The system of claim 1, wherein, between a photosensitive surface of the image receiver and an objective lens that forms an image on the photosensitive surface, a transparent plate is located, the surfaces of the transparent plate being deviated from a normal line to an axis of the objective lens.

* * * * *